United States Patent
Chen et al.

(10) Patent No.: US 11,473,013 B1
(45) Date of Patent: Oct. 18, 2022

(54) MAGNETIC SOIL REMEDIATION AGENT FOR SOIL HEAVY METAL POLLUTION, PREPARATION METHOD AND USE THEREOF

(71) Applicant: South China Normal University, Guangzhou (CN)

(72) Inventors: Tao Chen, Guangzhou (CN); Bo Yan, Guangzhou (CN); Jian Huang, Guangzhou (CN)

(73) Assignee: SOUTH CHINA NORMAL UNIVERSITY, Guangzhou (CN)

( * ) Notice: Subject to any disclaimer, the term of this patent is extended or adjusted under 35 U.S.C. 154(b) by 0 days.

(21) Appl. No.: 17/732,539

(22) Filed: Apr. 29, 2022

(30) Foreign Application Priority Data

May 8, 2021 (CN) .......................... 202110500856.5

(51) Int. Cl.
| | |
|---|---|
| *C09K 17/46* | (2006.01) |
| *B01J 20/22* | (2006.01) |
| *B01J 20/10* | (2006.01) |
| *B01J 20/06* | (2006.01) |
| *B09C 1/08* | (2006.01) |

(Continued)

(52) U.S. Cl.
CPC .............. *C09K 17/46* (2013.01); *B01J 20/06* (2013.01); *B01J 20/10* (2013.01); *B01J 20/22* (2013.01); *B01J 20/28009* (2013.01); *B01J 20/28021* (2013.01); *B01J 20/3204* (2013.01); *B01J 20/3223* (2013.01); *B01J 20/3265* (2013.01); *B01J 20/3293* (2013.01); *B09C 1/08* (2013.01)

(58) Field of Classification Search
CPC . C09K 17/46; B01J 20/06; B01J 20/10; B01J 20/22; B01J 20/28009; B01J 20/28021; B01J 20/3204; B01J 20/3223; B01J 20/3265; B01J 20/3293; B09C 1/08
USPC ...................................................... 405/128.5
See application file for complete search history.

(56) References Cited

FOREIGN PATENT DOCUMENTS

| CN | 101628224 A | 1/2010 |
|---|---|---|
| CN | 102701297 A | 10/2012 |
| CN | 104609684 A | 5/2015 |

(Continued)

OTHER PUBLICATIONS

English Translation of CN109794216A (Year: 2019).*

(Continued)

*Primary Examiner* — Anita Nassiri-Motlagh
(74) *Attorney, Agent, or Firm* — Bayramoglu Law Offices LLC

(57) ABSTRACT

A magnetic soil remediation agent for soil heavy metal pollution and a preparation method and application thereof are provided. The magnetic soil remediation agent is prepared by using remediation agent framework material and magnetic core material as raw materials, and heavy metal collector as modifier; said framework material is silicon dioxide activated by strong alkali; said magnetic core material comprises magnetic materials $Fe_3O_4$ and $\gamma\text{-}Fe_2O_3$; said modifier comprises ethylenediaminetetraacetic acid (EDTA), nitrilotriacetic acid trisodium salt (NTA), (S,S)-ethylenediamine-N,N-disuccinic acid trisodium salt (EDDS) and mercaptoethylamine. The remediation agent of the present invention can effectively passivate the heavy metals in the soil, reduce their available contents, and inhibit the absorption of heavy metals by plants.

9 Claims, 2 Drawing Sheets

(51) Int. Cl.
   *B01J 20/32*   (2006.01)
   *B01J 20/28*   (2006.01)

(56) References Cited

FOREIGN PATENT DOCUMENTS

| | | |
|---|---|---|
| CN | 105838384 A | 8/2016 |
| CN | 105903453 A | 8/2016 |
| CN | 108371942 A | 8/2018 |
| CN | 108456530 A | 8/2018 |
| CN | 108856278 A | 11/2018 |
| CN | 109456774 A | 3/2019 |
| CN | 109794216 A | 5/2019 |
| CN | 111167409 A | 5/2020 |
| CN | 112296075 A | 2/2021 |
| CN | 112480930 A | 3/2021 |
| JP | S57158285 A | 9/1982 |

OTHER PUBLICATIONS

Lijuan Cong, Study on the Adsorption of Cadmium Contaminated Soil by Magnetic Mesoporous Nanomaterial Adsorption and Magnetodynamic Separation, 2019, pp. 1-83.

* cited by examiner

MAGNETIC SOIL REMEDIATION AGENT FOR SOIL HEAVY METAL POLLUTION, PREPARATION METHOD AND USE THEREOF

CROSS REFERENCE TO THE RELATED APPLICATIONS

This application is based upon and claims priority to Chinese Patent Application No.: 202110500856.5, filed on May 8, 2021, the entire contents of which are incorporated herein by reference.

TECHNICAL FIELD

The invention relates to soil remediation technology, in particular to a magnetic soil remediation agent for soil heavy metal pollution and preparation method and use thereof.

BACKGROUND

With the continuous acceleration of the industrialization process, various pollutants containing heavy metals continue to enter the surrounding farmland soil through various channels such as industrial waste gas, pesticides and fertilizers, sewage irrigation, and waste accumulation and transfer, resulting in serious soil heavy metal pollution (Cd, Pb, As, Cr, and other pollution). Due to the irreversible and non-degradable characteristics of soil heavy metals, these heavy metals will bring huge harm after entering the farmland soil. They not only have a negative impact on the number and population structure of soil microorganisms, but also interfere with the normal metabolism of crops, resulting in reduced crop yield and quality. In addition, after these heavy metals are absorbed and enriched by crops in the soil, their heavy metal content exceeds the standard, and these heavy metals enter the human body through the food chain, and are enriched in different organs of the human body and cannot be discharged. As a result, they will cause irreversible harm to various physiological functions of the human body and bring serious threats to human life and health. Therefore, the restoration and management of soil environment is imminent.

However, since soil heavy metal pollution is not as easy to be detected as air and water pollution, and the harm it produces has a certain concealment; therefore, the discovery of heavy metal pollution in soil often has a certain hysteresis and cannot be repaired and treated in time. Once the harm of heavy metal pollution in farmland soil appears, the difficulty of heavy metal treatment will be intensified, and the treatment of heavy metals in soil will be costly, time-consuming and difficult. These problems all pose a huge challenge to the pollution control of soil heavy metals. Therefore, the pollution of heavy metals in farmland soil should be prevented in advance, and the transfer of heavy metals to agricultural soil should be avoided and prevented in time. At the same time, for soils that are easily polluted by heavy metals, the ability of the soil to passivate heavy metals should be improved as much as possible, so as to reduce the possible harm caused by the toxicity of heavy metals in the soil. Taking appropriate soil remediation measures for different soil heavy metal pollution situations is the main control strategy to reduce soil treatment costs and improve soil remediation efficiency.

At present, the commonly used passivating agents mainly include calcareous materials, phosphorus-containing passivating agents, carbon materials, clay minerals, organic fertilizers, agricultural wastes, etc. Among them, calcareous materials mainly realize the passivation of heavy metals by changing the soil pH, but excessive application will significantly affect the physical and chemical properties of the soil, resulting in the reduction of crop yields. Phosphorus-containing passivators are usually used for lead passivation, but high concentrations of phosphorus can also lead to the leaching of contaminants such as arsenic, increasing their mobility; and, as eutrophic substances, phosphorus-containing passivators are also prone to pollute the surrounding water bodies, so their application scope is limited. Carbon materials mainly use their large specific surface area to fix and passivate heavy metals through adsorption, but such passivators are not stable enough; with the degradation of carbon, the adsorbed metals will be re-released into the soil, resulting in pollution again. Organic fertilizers and agricultural wastes also have similar problems with carbon materials when dealing with soil heavy metal pollution, so their application scope is narrow. Clay minerals also use the characteristics of large specific surface area and charged structural layer to achieve passivation of heavy metals through adsorption, coordination and co-precipitation; however, they have strong adsorption selectivity for heavy metals, and are only suitable for repairing single heavy metal pollution; for the treatment of composite heavy metal-contaminated soil, they need to be used in conjunction with alkaline substances such as lime, and modification treatment is usually used to enhance the adsorption effect, and there is a certain risk of secondary pollution.

Silicate heavy metal passivator is an important soil heavy metal remediation agent, which can reduce heavy metal activity in soil, inhibit plant uptake and realize the remediation of heavy metal pollution in the soil by forming silicic acid compounds with heavy metals, affecting the rhizosphere redox capacity to reduce the activity of heavy metals, improving soil pH to inhibit the adsorption of heavy metals by plants, changing the form of heavy metals and hindering the migration of heavy metals to the aerial parts of plants, etc. At present, the market price of silicate heavy metal passivators is as high as 5000-10000 RMB/t. Although it can effectively modify the farmland soil polluted by heavy metals, the cost is too high.

SUMMARY

The purpose of the present invention is to aim at the above-mentioned problems, and provide a capture-functionalized magnetic soil remediation agent with amino and sulfhydryl groups for heavy metals in soil, which has a significant passivation and fixation effect on heavy metals, and can significantly inhibit the absorption of heavy metals by plants. The specific technical scheme is as follows:

A magnetic soil remediation agent for soil heavy metal pollution is prepared by using remediation agent framework material and magnetic core material as raw materials, and heavy metal collector as modifier;

said framework material is silicon dioxide activated by strong alkali;

said magnetic core material comprises magnetic materials $Fe_3O_4$ and $\gamma\text{-}Fe_2O_3$;

said modifier comprises ethylenediaminetetraacetic acid (EDTA), nitrilotriacetic acid trisodium salt (NTA), (S,S)-ethylenediamine-N,N-disuccinic acid trisodium salt (EDDS) and mercaptoethylamine.

Preferably, the mass ratio of said framework material, magnetic core material, and modifier is 1 (0.05-0.1):(0.005-0.01).

Preferably, the mass ratio of $Fe_3O_4$ and $\gamma\text{-}Fe_2O_3$ in said magnetic core material is (1.5-2):1.

Preferably, the mass ratio of EDTA:NTA:EDDS:mercaptoethylamine in said modifier is 1:(0.05-0.1):(0.1-0.2):(0.2-0.3).

Preferably, compared with the unmodified magnetic core material, said magnetic soil remediation agent has characteristic peaks at 26.8°, 35.3° and 62.2° in the XRD pattern, corresponding to $SiO_2$, $Fe_3O_4$, $\gamma\text{-}Fe_2O_3$; in the infrared spectrum analysis results, it has characteristic peaks at wave values 3461, 1637, 1432, 1090 and 795 cm$^{-1}$, and the infrared characteristic peaks correspond to silicon-oxygen bond, sulfhydryl and amino functional group.

One aspect of the present invention also provides a method for preparing any one of the above magnetic soil remediation agents, comprising the following steps:
(1) preparation of $SiO_2$ framework: $SiO_2$ powder is used as raw material, adding solid NaOH according to the mass ratio of $SiO_2$:NaOH 1:(0.1-0.15), then roasted, cooled and pulverized; and the excess NaOH is washed off so that the pH of the framework is 6.5-8.5;
(2) preparation of modifier: EDTA, NTA, EDDS, and mercaptoethylamine are taken, mixed evenly according to the mass ratio, and dissolved in water to obtain a modifier solution;
(3) the $SiO_2$ framework, the magnetic core material and the modifier solution are uniformly mixed in proportion, precipitated, filtered, heated for drying and pulverized to obtain the product.

Preferably, in said step (1), the roasting temperature is 800° C., roasting for 30-60 min, and the excess NaOH is washed off with water so that the pH of the framework is 6.5-8.5.

Preferably, in said step (3), the $SiO_2$ framework, the magnetic core material and the modifier solution are uniformly mixed in proportion, precipitated, filtered, heated for drying in a vacuum oven at 50° C. for 2-3 h, and pulverized, then the magnetic soil remediation agent of the present invention is obtained.

Another aspect of the present invention also provides the application of any one of the magnetic soil remediation agents described above in remediating polluted soil;
preferably, said polluted soil is heavily polluted soil of heavy metals in mining areas;
preferably, said polluted soil is heavy metal polluted soil with heavy metal Cd, As, and Hg content exceeding 5-10 times, 15-20 times, or 35-40 times of agricultural land soil standard.

The last aspect of the present invention provides a method of soil remediation, wherein any one of the magnetic soil remediation agents described above is applied to the polluted soil to be treated, and then mixed and stirred evenly;
said polluted soil is heavily polluted soil of heavy metals in mining areas; or said polluted soil is heavy metal polluted soil with heavy metal Cd, As, and Hg content exceeding 5-10 times, 15-20 times, or 35-40 times of agricultural land soil standard.

The applied amount of said magnetic soil remediation agent ranges from 50 to 200 g/m$^2$, more preferably from 80 to 150 g/m$^2$, and further preferably from 80 to 120 g/m$^2$ or 100 g/m$^2$.

The beneficial effects of the present invention are: the magnetic soil remediation agent for soil heavy metal pollution of the present invention can effectively change the redox potential of the soil for the magnetic function of heavy metals in the soil, and increase the migration ability of the heavy metals in the soil. The amino group and sulfhydryl group of the remediation material can effectively capture a variety of heavy metal elements to form heavy metal complexes on the surface of the magnetic soil remediation agent material. The active silicon-oxygen bond in the silicon dioxide activated by strong alkali can further form a heavy metal silicate structure with heavy metals, which increases the adsorption capacity of the material; moreover, the formed stable heavy metal silicate structure has a significant passivation and fixation effect on heavy metals, reduces their available contents, and can significantly inhibit the absorption of heavy metals by plants.

DETAILED DESCRIPTION OF THE EMBODIMENTS

Figure 1:
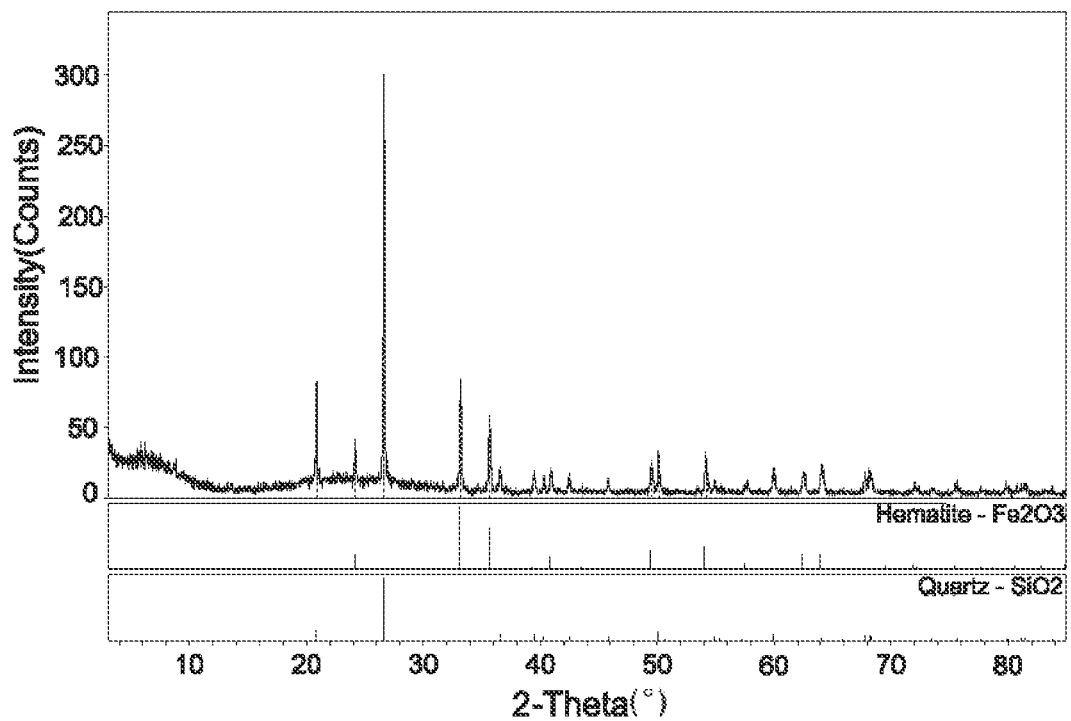
FIG. 1 is the XRD characterization diagram of the magnetic iron ore concentrate product.

The present invention will be further described below in conjunction with the examples, but the present invention is not limited thereby.

The experimental methods in the following examples, unless otherwise specified, are conventional methods; the chemical reagents used in each example, unless otherwise specified, are commercially available conventional reagents, which can be obtained through commercial purchase.

Main reagents:
Ethylenediaminetetraacetic acid (EDTA): CAS No. 60-00-4;
(S,S)-ethylenediamine-N,N-disuccinic acid trisodium salt (EDDS): CAS No. 178949-82-1;
Nitrilotriacetic acid trisodium salt (NTA): CAS No. 5064-31-3;
Mercaptoethylamine: CAS No. 60-23-1.

Example 1. Preparation of the Magnetic Soil Remediation Agent of the Present Invention 1. Preparation of the Magnetic Soil Remediation Agent of the Present Invention Taking magnetic materials $Fe_3O_4$ and $\gamma\text{-}Fe_2O_3$ as the magnetic core material, taking ethylenediaminetetraacetic acid (EDTA) as heavy metal collector, taking nitrilotriacetic acid trisodium salt (NTA), (S,S)-ethylenediamine-N, N-disuccinic acid trisodium salt (EDDS) and mercaptoethylamine as modifier, and taking the silicon dioxide activated by strong alkali as framework material, capture-functionalized magnetic soil remediation agent with amino and sulfhydryl groups was prepared.

The magnetic soil remediation agent of the present invention was prepared according to the following steps:
(1) Preparation of $SiO_2$ framework material: $SiO_2$ powder with a purity of 97% was taken as raw material, solid NaOH (purity 99%) was added according to the mass ratio of $SiO_2$:NaOH 1:(0.1-0.15), then roasted at 800° C. for 30-60 min; after cooling, the discharged material was ball milled and passed through a 200-mesh sieve, and washed with pure water (or tap water) to wash off excess NaOH, so that the pH of the framework material was between 6.5-8.5.

(2) Preparation of magnetic $Fe_3O_4$: prepared by conventional simple co-precipitation method, taking $FeCl_3$ and $FeCl_2.4H_2O$ as iron precursors, the mass ratio of $FeCl_3$:$FeCl_2.4H_2O$ was 1.63:1, and the main process was: first, 40 mL of dispersion liquid was prepared, and an aqueous solution containing a certain amount of iron precursors was added to it under constant stirring; after stirring for 30 min, methylamine was added to it until the pH reached 11; stirring was continued for 30 min at the predetermined reaction temperature of 30° C. to precipitate iron oxide particles (i.e. $Fe_3O_4$). Then, the solution was cooled to room temperature, the formed precipitate was separated by high-speed centrifugation, and finally dried in a vacuum oven at 50° C. for 1-2 hours, and magnetic $Fe_3O_4$ was obtained. The magnetic $Fe_3O_4$ can also be commercially available conventional magnetic $Fe_3O_4$ powder, which can be obtained commercially.

(3) The steps of preparing $\gamma$-$Fe_2O_3$:10.01 g $FeSO_4.7H_2O$ and 8.08 g $Fe(NO_3)_3.9H_2O$ were dissolved in 50 mL of water pre-sparged with nitrogen to eliminate oxygen dissolved in the water, and the molar ratio of $Fe^{2+}/Fe^{3+}$ was fixed at 1:1.8. The iron salt solution was slowly added to the 400 mL of deoxygenated $NH_4OH$ solution and homogenized using a magnetic stirrer; after the iron salt solution was added, the reaction was carried out under magnetic stirring and nitrogen for 5 h; then the pH value of the solution was adjusted to 2, 4 g of sodium citrate was added, and the solution was heated to 80° C. and stirred for 30 min; large agglomerates were eliminated at 2500 rpm, and several centrifugations at 5650 rpm were performed to separate the impurities in the sample and purify to obtain $\gamma$-$Fe_2O_3$. Commercially available $\gamma$-$Fe_2O_3$ powder, such as commercially available nano-$\gamma$-$Fe_2O_3$, can also be purchased directly.

(4) Compounding of modifier: EDTA, NTA, EDDS, and mercaptoethylamine were taken and mixed evenly according to a mass ratio of 1:(0.05-0.1):(0.1-0.2):(0.2-0.3), and dissolved in an aqueous solution to obtain the modifier.

(5) The prepared $SiO_2$ framework material, magnetic core material composed of magnetic $Fe_3O_4$ and $\gamma$-$Fe_2O_3$ ($Fe_3O_4$ and $\gamma$-$Fe_2O$ were mixed according to the mass ratio of (1.5-2):1, that was, the molar ratio of $Fe^{3+}$ and $Fe^{2+}$ was 4:1), modifier solution were mixed evenly in proportion, precipitated and filtered, dried in a vacuum oven at 50° C. for 2-3 hours, and pulverized (particle diameter <2 mm) to obtain the magnetic soil remediation agent of the present invention. The mass ratio of framework material, magnetic core material and modifier contained in the obtained magnetic soil remediation agent product was 1: (0.05-0.1):(0.005-0.01).

Four experimental groups of magnetic soil remediation agent products of the present invention were prepared according to the above method, and the specific components and dosages of each experimental group are shown in Table 1.

TABLE 1

| Experimental group | $SiO_2$(g) | $Fe_3O_4$(g) | $\gamma$-$Fe_2O_3$(g) | EDTA(g) | NTA(g) | EDDS (g) | Mercaptoethylamine (g) |
| --- | --- | --- | --- | --- | --- | --- | --- |
| Experimental group 1 | 100 | 3 | 2 | 0.74 | 0.04 | 0.07 | 0.15 |
| Experimental group 2 | 100 | 3.3 | 1.7 | 0.69 | 0.03 | 0.07 | 0.21 |
| Experimental group 3 | 100 | 6 | 4 | 0.36 | 0.04 | 0.04 | 0.07 |
| Experimental group 4 | 100 | 6.6 | 3.4 | 0.33 | 0.03 | 0.07 | 0.07 |

2. Product Composition Analysis and XRD Characterization

The products prepared in experimental groups 1-4 were taken for component analysis and XRD characterization, and the results of component analysis are shown in Table 2.

TABLE 2

Components analysis (%) of the magnetic soil remediation agent of the present invention

| Experimental group | Fe | CaO | $Al_2O_3$ | $SiO_2$ | Na | K | TOC |
| --- | --- | --- | --- | --- | --- | --- | --- |
| Experimental group 1 | 4.02 | 0.82 | 0.22 | 90.31 | 2.52 | 0.37 | 1.93 |
| Experimental group 2 | 3.88 | 0.79 | 0.22 | 90.55 | 3.15 | 0.22 | 1.85 |
| Experimental group 3 | 3.95 | 1.05 | 0.19 | 82.49 | 2.77 | 0.18 | 0.96 |
| Experimental group 4 | 4.30 | 1.02 | 0.22 | 81.50 | 4.02 | 0.55 | 0.95 |

It can be seen from Table 2 that some organic matter is attached to the product, and the TOC content of the organic matter is about 1-2%, indicating that the amino and sulfhydryl groups in the modifier were compounded in the magnetic material by modification in the present invention.

Figure 2:
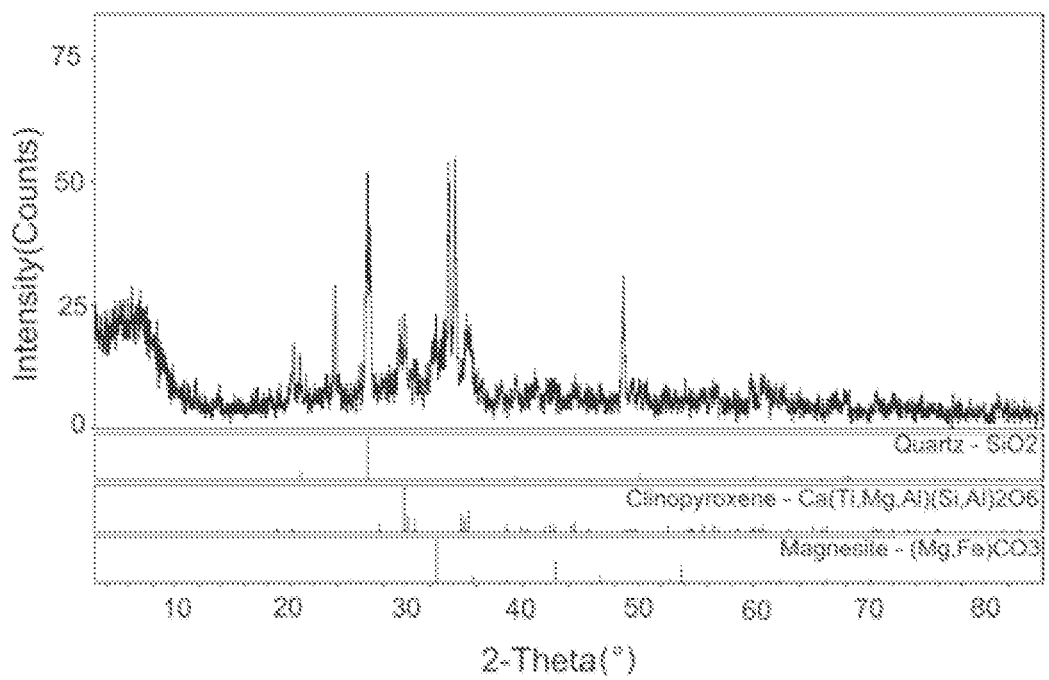
FIG. 2 is the XRD characterization diagram of the magnetic soil remediation agent of the present invention.

The XRD characterization of the product is shown in FIG. 1 and FIG. 2, and the XRD experimental parameters/conditions were as follows: using Cu-K$\alpha$ ($\lambda$=1.5406 Å) radiation, the X-ray diffraction (XRD) peak profiles of the magnetic soil remediation agent were obtained by X-ray diffractometer analysis, ranging from 5° to 85°, and X-ray diffraction patterns were recorded at a scan rate of 0.5°/min.

FIG. 1 shows the magnetic iron ore concentrate product.

FIG. 2 shows the magnetic soil remediation agent product of experimental group 1. It can be seen from the XRD characterization that the lattice structure of the product has undergone major changes. Compared with the magnetic iron ore concentrate raw material, the representative changes of the magnetic soil remediation agent product of the present invention were: the peak heights at 26.8°, 35.3°, and 62.2° had a significant decrease, which was the result of the partial conversion of $Fe_3O_4$ to $\gamma\text{-}Fe_2O_3$, and 25.1°, 35.3° and 62.2° were the reaction peaks of $Fe_3O_4$ crystals. The peaks of $\gamma\text{-}Fe_2O_3$ appeared at 24.0°, 26.8°, 33.1°, 35.3°, 35.6°, 40.8°, 49.4°, 62.2° and 63.9°, respectively; the peaks of $Fe_3O_4$ appeared at 30.1°, 35.3°, 43.3° 57.1° and 62.2°, respectively. The corresponding peaks for the hematite and magnetite phases appeared in FIG. 2, indicating the coexistence of these two phases in the material.

Figure 3:
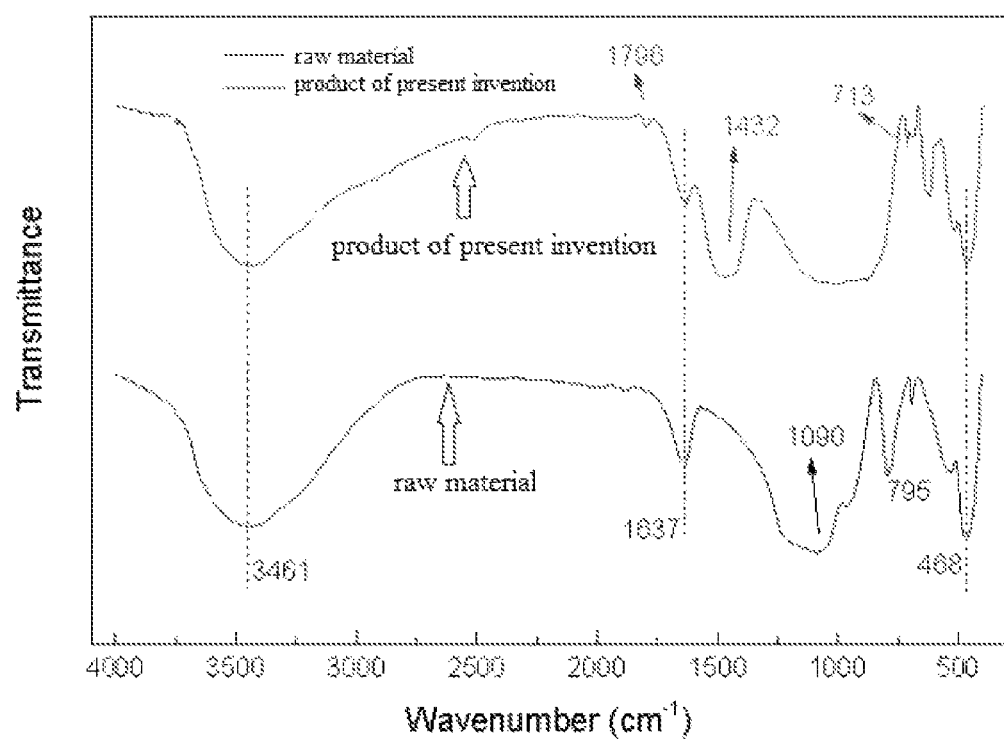
FIG. 3 is the infrared contrast chart of the magnetic soil remediation agent of the present invention.

Infrared detection of the product was performed, and infrared (FTIR, Nicolet 6700) analysis conditions were: the magnetic soil remediation agent was mixed with KBr particles and made into tablets, and the scanning resolution was 0.4 $cm^{-1}$, and the scanning range was 4000-650 $cm^{-1}$. FIG. 3 is the infrared contrast chart of the product of experimental group 1, it can be seen that compared with the raw material (i.e., $SiO_2$), the obtained modified product of the present invention had added functional group structure, and it had distinct characteristic peaks at wavenumbers 3461, 1637, 1432, 1090 and 795 $cm^{-1}$; wherein, 3461 and 1637 $cm^{-1}$ were the stretching peaks of —OH and carboxyl COO— (C=O) respectively, 1432 $cm^{-1}$ was the folding peak of Fe(III)-modified material complex, the peaks at 1090 and 795 $cm^{-1}$ were denoted as the characteristic absorption peak of silicate and the stretching vibration peak of silicon-oxygen octahedron respectively, and the characteristic peaks of $\gamma\text{-}Fe_2O_3$ and $Fe_3O_4$ appeared around 468 $cm^{-1}$, which were mainly Fe—O bond vibration peaks.

Example 2. Application of the Soil Remediation Agent of the Present Invention

1. Research on Pot Experiment of Soil Remediation Agent Product of the Present Invention In order to study the effect of the soil remediation agent of the present invention on the remediation effect of soil heavy metal pollution and the influence on the absorption of heavy metals by plants, a farmland experiment was carried out with Chinese cabbage as the object. The morphological changes of heavy metals Pb, Cu, Cr, Cd, Hg, As in soil and their effects on crop growth were mainly analyzed.

Experimental Method:

A polluted farmland in a large lead-zinc mine was selected for field plot experiments, and soil was collected for cultivation experiments and pot experiments. Two treatments were prepared in this experiment: the control group (without adding the magnetic soil remediation agent of the present invention) and the magnetic soil remediation agent treatment group (different dosages were set: 50 $g/m^2$, 80 $g/m^2$, 100 $g/m^2$, 120 $g/m^2$, 150 $g/m^2$, 200 $g/m^2$). Each treatment contained 4 replicate plots, each with an area of 20 $m^2$ (4 m×5 m), and the plots were randomly arranged. One week before sowing, the magnetic soil remediation agent was added in the experimental field of the treatment group, the magnetic soil remediation agent (particle diameter <2 mm) of the experimental group 1 in Example 1 was added to the soil, and thoroughly mixed with topsoil (0-10 cm depth) by hand tillage; one week later, the pakchoi variety "si yue man" was sown, and daily management was carried out according to the conventional field management methods of pakchoi. Fertilization management was as follows: before planting pakchoi, nitrogen and phosphorus compound fertilizer was applied at a rate of 225 kg/ha as base fertilizer, and nitrogen fertilizer was applied within 1 month after planting. Soil samples collection: the soil samples were collected before the application of the magnetic soil remediation agent and after the pakchoi was matured, and the pakchoi samples were collected after the pakchoi was matured.

2. The influence of the application of the soil remediation agent of the present invention on soil heavy metals (1) Changes of Available and Residual States of Heavy Metals in Soil The available state and residual state of soil heavy metals Pb, Cu, Cr, Cd, Hg, As after different application dosages of soil remediation agent were detected.

The detection method of available state of heavy metals in soil was as follows: the available Pb, Cu, Cr, Cd, Hg and As in the soil were determined by leaching with DTPA solution (0.005 mol/L diethyltriaminepentaacetic acid DTPA+0.01 mol/L $CaCl_2$+0.1 mol/L triethanolamine TEA), the pH of the solution was adjusted to 7.3±0.05, and the solution was shaken at 180 rpm for 2 h at room temperature; the extract solution was adjusted to volume with 5 g/L tartaric acid and filtered through a 0.45 um aqueous membrane, the contents of Pb, Cu, Cr and Cd were determined by flame atomic absorption spectrophotometer, and the contents of Hg and As were determined by atomic fluorescence spectrometer.

The detection method of residual state of heavy metals in soil was as follows: 0.2000-0.5000 g of air-dried residual soil which passed a 100-mesh sieve was put into the digestion tank, concentrated nitric acid (6 mL), concentrated hydrochloric acid (2 mL), and 30% hydrogen peroxide (2 mL) were added sequentially; after the bubbles in the digestion tank were eliminated, the lid was put on and tightened, then the tank was put into the microwave digestion apparatus. The temperature was programmed according to the program, and the digestion was carried out at 200° C. for 30 min. After the heating was completed, the digestion tank was opened after cooling to room temperature; the digestion solution was transferred into a 50 mL colorimetric tube, adjusted to volume with 5 g/L tartaric acid, shaken well, left to stand, and passed through a 0.45 um aqueous filter; the contents of Pb, Cu, Cr and Cd were determined by flame atomic absorption spectrophotometer, and the contents of Hg and As were determined by atomic fluorescence spectrometer.

The experimental results showed that: with the application amount of the remediation agent in the range of 50-150 $g/m^2$, among the six different metals, the available states of Pb, Cu, Cr, Cd, Hg, and As showed a decreasing trend with the increase of the applied amount, and the decreasing amplitude of the available state gradually increased; while the content of residual state increased gradually with the increase of the application amount of the remediation agent, and the larger the application amount, the greater the increase. It can be seen that the remediation agent had a significant passivation and fixation effect on heavy metals.

At the same time, it was found that when the application amount of the remediation agent was above 150 $g/m^2$, the passivation and fixation effect no longer increased, but showed a slow decline trend. Therefore, the application amount of the remediation agent can be in the range of 50-200 $g/m^2$, and the better range is 80-150 $g/m^2$. Considering the cost and effect, the optimal range is 80-120 $g/m^2$ or 100 $g/m^2$.

Thereinto, the test results of the experimental groups with application amounts of 0, 50 $g/m^2$, 100 $g/m^2$ and 200 $g/m^2$ are shown in Table 3-Table 8

TABLE 3

Effects of remediation agent on available and residual states of Pb in soil

| Applied amount | Pb Available state | | Pb Residual state | |
|---|---|---|---|---|
| (g/m$^2$) | Content (%) | Decrease (%) | Content (%) | Increase (%) |
| Blank | 16.40 | / | 13.3 | / |
| 50 | 14.45 | 11.9 | 16.4 | 23.8 |
| 100 | 12.27 | 25.2 | 20.7 | 56.1 |
| 200 | 14.05 | 14.3 | 18.1 | 36.7 |

TABLE 4

Effects of remediation agent on available and residual states of Cu in soil

| Applied amount | Cu Available state | | Cu Residual state | |
|---|---|---|---|---|
| (g/m$^2$) | Content (%) | Decrease (%) | Content (%) | Increase (%) |
| Blank | 12.65 | / | 5.8 | / |
| 50 | 10.20 | 19.4 | 7.3 | 26.5 |
| 100 | 5.54 | 56.2 | 10.8 | 86.8 |
| 200 | 8.62 | 31.9 | 9.9 | 70.7 |

TABLE 5

Effects of remediation agent on available and residual states of Cr in soil

| Applied amount | Cr Available state | | Cr Residual state | |
|---|---|---|---|---|
| (g/m$^2$) | Content (%) | Decrease (%) | Content (%) | Increase (%) |
| Blank | 1.66 | / | 8.9 | / |
| 50 | 1.46 | 12.3 | 11.8 | 31.9 |
| 100 | 0.95 | 43.0 | 16.8 | 87.5 |
| 200 | 1.30 | 22.0 | 14.2 | 58.6 |

TABLE 6

Effects of remediation agent on available and residual states of Cd in soil

| | Cd Available state | | Cd Residual state | |
|---|---|---|---|---|
| (g/m$^2$) | Content (%) | Decrease (%) | Content (%) | Increase (%) |
| Blank | 45.08 | / | 4.9 | / |
| 50 | 40.73 | 9.6 | 10.1 | 107.3 |
| 100 | 28.39 | 37.0 | 24.1 | 394.5 |
| 200 | 34.62 | 23.2 | 18.3 | 274.7 |

TABLE 8

Effects of remediation agent on available and residual states of As in soil

| Applied amount | As Available state | | As Residual state | |
|---|---|---|---|---|
| (g/m$^2$) | Content (%) | Decrease (%) | Content (%) | Increase (%) |
| Blank | 0.25 | / | 45.8 | / |
| 50 | 0.18 | 25.2 | 48.9 | 6.8 |
| 100 | 0.13 | 48.7 | 57.0 | 24.6 |
| 200 | 0.15 | 40.6 | 53.2 | 16.3 |

TABLE 7

Effects of remediation agent on available and residual states of Hg in soil

| Applied amount | Hg Available state | | Hg Residual state | |
|---|---|---|---|---|
| (g/m$^2$) | Content (%) | Decrease (%) | Content (%) | Increase (%) |
| Blank | 5.31 | / | 46.0 | / |
| 50 | 4.00 | 24.7 | 49.9 | 8.4 |
| 100 | 1.61 | 69.7 | 60.2 | 30.9 |
| 200 | 2.56 | 51.7 | 55.7 | 21.1 |

It can be seen from Table 3-8 that among the six different metals, the contents of available states of Pb, Cu, Cr, Cd, Hg and As, with the addition of soil remediation agent, showed a downward trend within a certain range of application rates; and the greater the amount of soil remediation agent added, the greater the decrease. The contents of the residual states gradually increased with the addition of the remediation agent, and the larger the amount added, the greater the increase; thereinto, 100 g/m$^2$ had the best effect. It can be seen that the remediation agent had a significant passivation and fixation effect on heavy metals.

(2) Changes of Heavy Metal Forms in Soil

In order to further study the speciation changes of soil heavy metals Pb, Cu, Cr, Cd, Hg, and As after different amounts of remediation agent applied, the various forms of heavy metals were detected:

Methods of analyzing various forms of heavy metals: the speciation analysis of Pb, Cu, Cr, Cd and Hg in soil was determined by Tessier method, and the exchangeable state was extracted with 1 mol/L MgCl$_2$ with pH 7 at room temperature with shaking for 1 h; the carbonate-bound state was extracted with 1 mol/L NaAc solution with pH 5 at room temperature with shaking for 6 h; the oxidation state of iron and manganese was extracted with a mixed solution of 0.04 mol/L NH$_2$OH.HCl and 25% (v/v) HOAc at 96±3° C. with shaking for 6 h; for the organically bound state extraction, 0.02 mol/L HNO$_3$+30% H$_2$O$_2$(pH=2) was used for shaking at 85±2° C. for 2 h, then 30% H$_2$O$_2$ was added to shake at 85±2° C. for 3 h, and then 3.2 mol/L of 20% (v/v) HNO$_3$ was added to shake for 30 min; the residual state was analyzed by microwave digestion with 3 mL of nitric acid and 9 mL of hydrochloric acid.

The speciation of As in the soil was analyzed by the Wenel continuous extraction method, and the non-specific adsorption state of As was extracted with 0.05 mol/L (NH$_4$)$_2$SO$_4$ solution with shaking for 4 h; the obligate adsorption state of As was extracted with 0.05 mol/L (NH$_4$)H$_2$PO$_4$ solution with shaking for 16 h; the amorphous and weakly crystalline hydrated iron-aluminum oxide binding state of As was extracted with 0.2 mol/L (NH4)$_2$C$_2$O$_4$ buffer (pH=3.25) under dark shaking for 4 h, washed with 0.2 mol/L (NH4)$_2$C$_2$O$_4$ buffer (pH=3.25) with shaking for 10 min in the dark after centrifugation and filtration, and the supernatant was collected; the crystalline hydrated iron-aluminum oxide binding state of As was extracted with 0.2 mol/L (NH$_4$)$_2$C$_2$O$_4$ and 0.1 mol/L ascorbic acid solution at 96° C. for 30 min in a water bath, washed with 0.2 mol/L (NH4)$_2$C$_2$O$_4$ buffer (pH=3.25) after centrifugation and filtration, and shaken for 10 min in the dark; the residual state was analyzed by microwave digestion with 3 mL of nitric acid and 9 mL of hydrochloric acid.

The experimental results showed that among the six different heavy metals, for the exchangeable state and carbonate-bound state of the forms of Pb, Cu, Cr, Cd, Hg, and As, which were migrable, transformable and easily absorbed by plants, the distribution rate showed a downward trend as the added amount increased, and the larger the added amount, the greater the decrease of distribution rate, with the remediation agent application amount in the range of 50-150 g/m$^2$.

At the same time, it was found that when the application amount of the remediation agent was above 150 g/m$^2$, the distribution rate of the exchangeable and carbonate-bound states of heavy metals no longer decreased. Therefore, the same conclusion was drawn from the change experiment of "changes of available and residual states of heavy metals in soil"; the application amount of the remediation agent of the present invention can be in the range of 50-200 g/m$^2$, and the better range is 80-150 g/m$^2$. Considering the cost and effectiveness, the optimal range is 80-120 g/m$^2$ or 100 g/m$^2$. Thereinto, the test results of the experimental groups with the application amount of 0, 50 g/m$^2$, 100 g/m$^2$ and 200 g/m$^2$ are shown in Table 9-Table 14.

TABLE 9

Effects of soil remediation agents on the speciation changes of Pb

| Applied amount rate g/m$^2$ | Exchangeable state | | Carbonate-bound state | | Iron manganese oxide bound state | | Organically bound state | | Total | |
|---|---|---|---|---|---|---|---|---|---|---|
| | distribution (%) | decrease rate (%) | distribution (%) | decrease rate (%) | distribution (%) | decrease rate (%) | distribution (%) | decrease rate (%) | distribution (%) | decrease (%) |
| blank | 0.5 | — | 15.9 | — | 53.1 | — | 17.3 | — | 86.7 | — |
| 50 | 0.3 | 34.3 | 14.1 | 11.2 | 48.2 | 9.1 | 20.9 | −21.1 | 83.6 | 3.6 |
| 100 | 0.2 | 64.9 | 12.1 | 24.0 | 42.8 | 19.3 | 24.2 | −40.2 | 79.3 | 8.6 |
| 200 | 0.2 | 53.5 | 13.8 | 13.2 | 44.5 | 16.0 | 23.3 | −34.6 | 81.9 | 5.6 |

TABLE 10

Effects of soil remediation agents on the speciation changes of Cu

| Applied amount rate g/m$^2$ | Exchangeable state | | Carbonate-bound state | | Iron manganese oxide bound state | | Organically bound state | | Total | |
|---|---|---|---|---|---|---|---|---|---|---|
| | distribution (%) | decrease rate (%) | distribution (%) | decrease rate (%) | distribution (%) | decrease rate (%) | distribution (%) | decrease rate (%) | distribution (%) | decrease (%) |
| blank | 3.1 | — | 9.5 | — | 39.2 | — | 42.4 | — | 94.2 | — |
| 50 | 2.1 | 31.1 | 8.1 | 15.6 | 27.9 | 28.7 | 54.6 | −28.7 | 92.7 | 1.6 |
| 100 | 1.6 | 47.5 | 3.9 | 59.0 | 13.2 | 66.3 | 70.5 | −66.1 | 89.2 | 5.3 |
| 200 | 1.8 | 41.1 | 6.8 | 28.8 | 20.2 | 48.3 | 61.3 | −44.5 | 90.1 | 4.3 |

TABLE 11

Effects of soil remediation agents on the speciation changes of Cr

| Applied amount rate g/m$^2$ | Exchangeable state | | Carbonate-bound state | | Iron manganese oxide bound state | | Organically bound state | | Total | |
|---|---|---|---|---|---|---|---|---|---|---|
| | distribution (%) | decrease rate (%) | distribution (%) | decrease rate (%) | distribution (%) | decrease rate (%) | distribution (%) | decrease rate (%) | distribution (%) | decrease (%) |
| blank | 0.0 | — | 1.6 | — | 41.2 | — | 48.2 | — | 91.1 | — |
| 50 | 0.0 | 26.7 | 1.4 | 12.1 | 29.2 | 29.2 | 57.6 | −19.4 | 88.2 | 3.1 |
| 100 | 0.0 | 53.3 | 1.3 | 21.4 | 25.8 | 37.4 | 58.7 | −21.8 | 85.8 | 5.8 |
| 200 | 0.0 | 70.0 | 0.9 | 42.5 | 23.0 | 44.2 | 59.3 | −22.9 | 83.2 | 8.6 |

TABLE 12

Effects of soil remediation agents on the speciation changes of Cd

| Applied amount rate g/m$^2$ | Exchangeable state | | Carbonate-bound state | | Iron manganese oxide bound state | | Organically bound state | | Total | |
|---|---|---|---|---|---|---|---|---|---|---|
| | distribution (%) | decrease rate (%) | distribution (%) | decrease rate (%) | distribution (%) | decrease rate (%) | distribution (%) | decrease rate (%) | distribution (%) | decrease (%) |
| blank | 4.0 | — | 41.1 | — | 46.0 | — | 4.0 | — | 95.1 | — |
| 50 | 2.6 | 34.8 | 38.2 | 7.2 | 43.6 | 5.3 | 5.6 | −39.0 | 89.9 | 5.5 |
| 100 | 0.0 | 100.0 | 28.4 | 31.0 | 40.4 | 12.2 | 7.1 | −77.5 | 75.9 | 20.2 |

TABLE 12-continued

Effects of soil remediation agents on the speciation changes of Cd

| Applied amount rate g/m² | Exchangeable state | | Carbonate-bound state | | Iron manganese oxide bound state | | Organically bound state | | Total | |
|---|---|---|---|---|---|---|---|---|---|---|
| | distribution decrease (%) | rate (%) | distribution decrease (%) | rate (%) | distribution decrease (%) | rate (%) | distribution decrease (%) | rate (%) | distribution decrease (%) | (%) |
| 200 | 1.3 | 67.7 | 33.3 | 18.9 | 41.1 | 10.7 | 6.0 | −49.5 | 81.7 | 14.1 |

TABLE 13

Effects of soil remediation agents on the speciation changes of Hg

| Applied amount rate g/m² | Exchangeable state | | Carbonate-bound state | | Iron manganese oxide bound state | | Organically bound state | | Total | |
|---|---|---|---|---|---|---|---|---|---|---|
| | distribution decrease (%) | rate (%) | distribution decrease (%) | rate (%) | distribution decrease (%) | rate (%) | distribution decrease (%) | rate (%) | distribution decrease (%) | (%) |
| blank | 0.03 | — | 0.08 | — | 5.2 | — | 48.7 | — | 54.0 | — |
| 50 | 0.03 | 10.0 | 0.04 | 44.5 | 3.9 | 24.5 | 46.1 | 5.3 | 50.1 | 7.2 |
| 100 | 0.01 | 81.3 | 0.01 | 91.7 | 1.6 | 69.3 | 38.1 | 21.7 | 39.7 | 26.4 |
| 200 | 0.02 | 44.8 | 0.04 | 50.8 | 2.5 | 51.8 | 41.7 | 14.3 | 44.3 | 18.0 |

TABLE 14

Effects of soil remediation agents on the speciation changes of As

| Applied amount rate g/m² | Exchangeable state | | Carbonate-bound state | | Iron manganese oxide bound state | | Organically bound state | | Total | |
|---|---|---|---|---|---|---|---|---|---|---|
| | distribution decrease (%) | rate (%) | distribution decrease (%) | rate (%) | distribution decrease (%) | rate (%) | distribution decrease (%) | rate (%) | distribution decrease (%) | (%) |
| blank | 0.09 | — | 0.15 | — | 6.8 | — | 47.2 | — | 54.2 | — |
| 50 | 0.04 | 56.9 | 0.14 | 6.0 | 5.3 | 22.3 | 45.7 | 3.3 | 51.1 | 5.7 |
| 100 | 0.02 | 74.4 | 0.10 | 33.2 | 3.2 | 52.2 | 39.6 | 16.1 | 43.0 | 20.8 |
| 200 | 0.03 | 66.8 | 0.12 | 24.9 | 4.4 | 34.8 | 42.2 | 10.6 | 46.8 | 13.7 |

As can be seen from Table 9-14, among the six different metals, for the exchangeable state and carbonate-bound state of the forms of Pb, Cu, Cr, Cd, Hg, and As, which were migrable, transformable and easily absorbed by plants, the distribution rate showed a downward trend as the addition of the remediation agent within a certain range of application amount, and the larger the added amount, the greater the decrease of distribution rate; thereinto, 100 g/m² worked best.

It can be seen that the remediation agent of the present invention has a significant passivation and fixation effect on heavy metals, and can repair heavy metal-contaminated soil.

3. Effects of the Remediation Agent on Heavy Metal Content of Crops

The content of heavy metals Pb, Cr, Cd, Hg and As in plants with different application amounts of remediation agent was detected. The detection method was as follows: the sample was carried out microwave digestion in nitric acid and 30% $H_2O_2$, and after cooling to room temperature, made up to 50 mL with 5 g/L tartaric acid; the contents of Pb, Cr and Cd were determined by flame atomic absorption spectrometer, and the contents of Hg and As were determined by fluorescence photometer.

The test results are shown in Table 15.

TABLE 15

Effects of soil remediation agent added amount on the decreases of heavy metals contents in plants

| Applied amount g/m² | Pb | | Cr | | Cd | | Hg | | As | |
|---|---|---|---|---|---|---|---|---|---|---|
| | Content (mg/kg) | Decrease (%) | Content (mg/kg) | Decrease (%) | Content (mg/kg) | Decrease (%) | Content (mg/kg) | Decrease (%) | Content (mg/kg) | Decrease (%) |
| Blank | 0.41 | — | 0.66 | — | 0.29 | — | 0.014 | — | 0.08 | — |
| 50 | 0.38 | 8.06 | 0.53 | 19.57 | 0.24 | 17.02 | 0.012 | 17.54 | 0.06 | 27.83 |
| 100 | 0.28 | 32.15 | 0.44 | 33.86 | 0.18 | 37.11 | 0.009 | 35.61 | 0.05 | 36.45 |

TABLE 15-continued

Effects of soil remediation agent added amount on the decreases of heavy metals contents in plants

| Applied | Pb | | Cr | | Cd | | Hg | | As | |
|---|---|---|---|---|---|---|---|---|---|---|
| amount g/m$^2$ | Content (mg/kg) | Decrease (%) | Content (mg/kg) | Decrease (%) | Content (mg/kg) | Decrease (%) | Content (mg/kg) | Decrease (%) | Content (mg/kg) | Decrease (%) |
| 200 | 0.32 | 20.97 | 0.48 | 27.07 | 0.20 | 29.96 | 0.011 | 23.48 | 0.05 | 34.66 |
| Standard* | 0.3 | | 0.5 | | 0.2 | | 0.01 | | 0.5 | |

*Note: "Standard" in the table refers to "National Food Safety Standard - Limits of Contaminants in Foode (GB 2762-2012)

It can be seen from Table 15 that the contents of Pb, Cr, Cd, Hg, and As in Chinese cabbage decreased significantly after the soil remediation agent was added. Moreover, with the increase of the addition amount of the remediation agent, within a certain application amount range, its decreasing range gradually increased. In the experimental group with an application amount of about 100 g/m$^2$, the heavy metals contents of the plants dropped below the qualified limits. It shows that the soil remediation agent of the present invention can significantly inhibit the absorption of heavy metals by plants.

What is claimed is:

1. A magnetic soil remediation agent for soil heavy metal pollution, prepared by using a remediation agent framework material and a magnetic core material as raw materials, and a heavy metal collector as a modifier;
   the remediation agent framework material is silicon dioxide activated by a strong alkali; the remediation agent framework material is prepared according to the following method: SiO$_2$ powder is used as raw material, adding solid NaOH according to a mass ratio of SiO$_2$:NaOH of 1:(0.1-0.15), then roasted, cooled and pulverized; and an excess NaOH is washed off so that a pH of the remediation agent framework material is 6.5-8.5;
   the magnetic core material comprises magnetic materials Fe$_3$O$_4$ and γ-Fe$_2$O$_3$, and a mass ratio of Fe$_3$O$_4$ and γ-Fe$_2$O$_3$ is (1.5-2):1;
   the modifier comprises ethylenediaminetetraacetic acid (EDTA), nitrilotriacetic acid trisodium salt (NTA), (S,S)-ethylenediamine-N,N-disuccinic acid trisodium salt (EDDS), and mercaptoethylamine, and a mass ratio of EDTA:NTA:EDDS:mercaptoethylamine in the modifier is 1:(0.05-0.1):(0.1-0.2) (0.2-0.3);
   a mass ratio of the remediation agent framework material, the magnetic core material, and the modifier is 1:(0.05-0.1):(0.005-0.01), and the remediation agent framework material, the magnetic core material, and the modifier are uniformly mixed in proportion, precipitated, filtered, heated for drying and pulverized to obtain the magnetic soil remediation agent.

2. A preparation method of the magnetic soil remediation agent according to claim 1, comprising the following steps:

(1) preparation of SiO$_2$ framework: using SiO$_2$ powder as raw material, adding solid NaOH according to the mass ratio of SiO$_2$:NaOH of 1:(0.1-0.15), then roasting, cooling and pulverizing; and washing off the excess NaOH so that the pH of the SiO$_2$ framework is 6.5-8.5;

(2) preparation of the modifier: the EDTA, the NTA, the EDDS, and the mercaptoethylamine are taken, mixed evenly according to the mass ratio of 1:(0.05-0.1):(0.1-0.2):(0.2-0.3), and dissolving in water to obtain a modifier solution;

(3) uniformly mixing the SiO$_2$ framework, the magnetic core material, and the modifier solution in proportion, precipitating, filtering, heating for drying and pulverizing to obtain the magnetic soil remediation agent.

3. The preparation method according to claim 2, wherein in step (1), a roasting temperature is 800° C., a roasting time is 30-60 min, and the excess NaOH is washed off with water so that the pH of the SiO$_2$ framework is 6.5-8.5.

4. The preparation method according to claim 2, wherein in step (3), the SiO$_2$ framework, the magnetic core material, and the modifier solution are uniformly mixed in proportion, precipitated, filtered, heated for drying in a vacuum oven at 50° C. for 2-3 h, and pulverized to obtain the magnetic soil remediation agent.

5. A method of soil remediation, wherein the magnetic soil remediation agent according to claim 1 is applied to a polluted soil to be treated, and then mixed and stirred evenly; the polluted soil is a heavy metal polluted soil in mining areas.

6. The method according to claim 5, wherein an applied amount of the magnetic soil remediation agent ranges from 50 to 200 g/m$^2$.

7. The method according to claim 6, wherein the applied amount of the magnetic soil remediation agent ranges from 80 to 150 g/m$^2$.

8. The method according to claim 7, wherein the applied amount of the magnetic soil remediation agent ranges from 80 to 120 g/m$^2$.

9. The method according to claim 8, wherein the applied amount of the magnetic soil remediation agent is 100 g/m$^2$.

* * * * *